C. S. SHARP.
DRAFT CONNECTION.
APPLICATION FILED APR. 18, 1912. RENEWED MAR. 22, 1913.
1,109,875.
Patented Sept. 8, 1914.
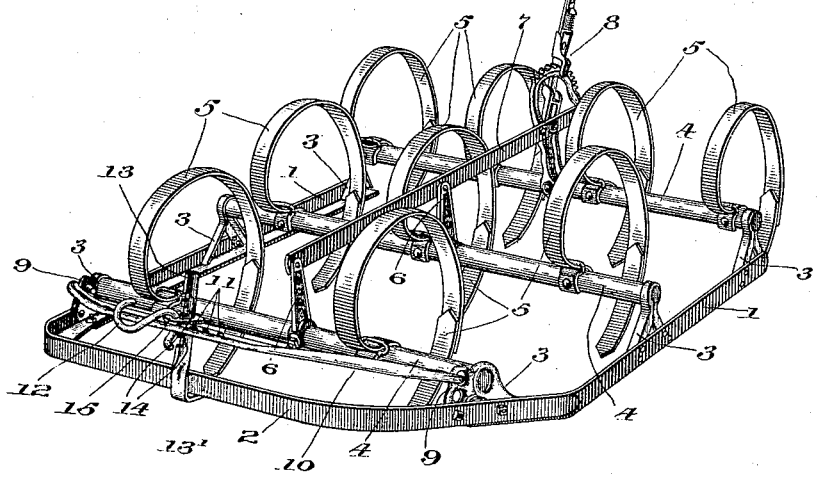
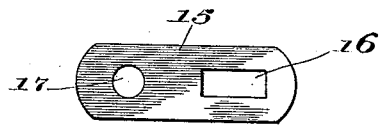
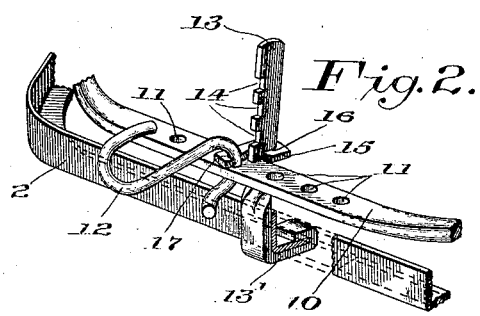
Witnesses
C. C. Palmer
F. W. Hoffmeister
Inventor.
Charles S. Sharp,
By E. W. Burgess
Attorney
THE NORRIS PETERS CO., PHOTO-LITHO., WASHINGTON, D. C.

UNITED STATES PATENT OFFICE.

CHARLES S. SHARP, OF AUBURN, NEW YORK, ASSIGNOR TO INTERNATIONAL HARVESTER COMPANY OF NEW JERSEY, A CORPORATION OF NEW JERSEY.

DRAFT CONNECTION.

1,109,875. Specification of Letters Patent. Patented Sept. 8, 1914.

Application filed April 18, 1912, Serial No. 691,667. Renewed March 22, 1913. Serial No. 756,212.

*To all whom it may concern:*

Be it known that I, CHARLES S. SHARP, a citizen of the United States, residing at Auburn, in the county of Cayuga and State of New York, have invented certain new and useful Improvements in Draft Connections, of which the following is a specification.

My invention relates to draft connections, and especially to those adapted to be used in connection with a harrow or other land tillage implement, the object of my invention being to provide a draft connection which may be easily and quickly adjusted in a manner to move the line of draft laterally or vertically relative to the device drawn, thereby, this draft connection being simple in its construction and efficient in operation.

In the accompanying drawings I have illustrated one embodiment which my invention may assume in practice, showing the same used in connection with a harrow, although it is to be understood that the same may be used in other relations if desired.

Figure 1 represents a perspective view of a harrow having my improved draft connection forming a part thereof; Fig. 2 represents a view in perspective of the draft connection as broken away from Fig. 1; and Fig. 3 is a plan view of a detail part of the draft mechanism.

The same reference characters designate like parts throughout the several views.

The harrow frame includes longitudinally arranged side frame members 1 upon opposite sides of the implement, having the front ends thereof connected by means of a U-shaped frame member 2, said frame members being preferably formed from angle bars having horizontal and upright web portions and having the horizontal web portion turned inwardly upon the bottom of the frame. Bracket members 3 are secured to the side frame members in spaced relation, and journaled in the upper ends thereof are rocking tooth supporting bars 4, having curved spring teeth 5 secured thereto, the position of the bars being controlled by means including arms 6 secured to the middle portion thereof and having the upper ends of the arms connected by means of a longitudinally arranged bar 7, the rear end of which is connected with a hand lever and toothed sector mechanism 8 in a well-known way.

The draft mechanism includes ear members 9 integral with the bracket members 3 at the front ends of the side frame members and having lateral openings therein that receive the hook-shaped rearwardly curved ends of a U-shaped draft member or link 10 in a manner permitting said member to be raised or lowered at its front side relative to the frame of the harrow; the draft member being arranged substantially parallel with the front member of the frame and provided with a series of openings 11 spaced apart laterally relative to the line of draft and adapted to selectively receive a draft member or hook 12. 13 represents a vertically arranged standard having the lower end thereof provided with a loop portion 13¹ adapted to loosely and slidably receive the U-shaped frame member, whereby the standard may be adjusted laterally thereupon; the upper end of the standard being provided with a series of notches 14 upon the front side thereof that are spaced apart in a vertical direction and adapted to selectively engage with the rear edge of the draft member 10. 15 represents a locking plate provided with a slotted opening 16 at one end that slidably receives the upper end of standard 13, and an opening 17 at the opposite end thereof that is adapted to register with the openings 11 in draft member 10 and receive the draft hook 12. When it is desired to adjust the draft connection laterally or vertically, the hook 12 is removed and the standard 13 may then be moved along the frame member, and the upper end may be moved rearward in a manner to release it from engagement with the draft member 10, permitting the latter member to be raised or lowered and placed in engagement with any one of the series of notches in the standard, and when the hook 12 is passed through the openings in the locking plate and draft member 10, the various parts of the draft mechanism are securely locked in operative relation.

While I have in this application specifically described one embodiment which my invention may assume, it is, of course, to be understood that the form chosen is used for the purpose of illustration, and that the invention itself may be embodied in various other forms without departing from its spirit.

What I claim as my invention, and desire to secure by Letters Patent, is:

1. In a draft connection, a frame, a draft link attached thereto, a draft member therefor, and means rigidly connecting said elements for adjusting said draft member into any one of a plurality of positions in any one of a plurality of planes intersecting substantially at right angles to each other.

2. In a draft connection, a frame, a draft link attached thereto, a member engaged by said link in any one of a plurality of positions of the latter, said member being adjustable with respect to said frame, a draft member attached adjustably to said link, and means for rigidly locking together all of the above mentioned elements.

3. In a draft connection, a frame, a notched standard adjustably mounted thereon, a swinging draft link pivotally connected to said frame and movable into engagement with the notches in said standard, and a single means locking said standard in position on said frame and said link in position on said standard.

4. In a draft connection, a frame, a notched standard carried thereon, a swinging draft link pivoted to said frame and movable into engagement with the notches on said standard, a draft member adjustably mounted on said link, and means for locking said link in position upon said standard releasable upon removal of said draft member.

5. In a draft connection, a frame, a standard protruding substantially at right angles to a portion thereof and adjustable longitudinally thereon, a draft link pivoted to said frame and extending substantially parallel thereto, and means for positioning said draft link in any one of a plurality of positions upon said standard.

6. In a draft connection, a frame, a standard disposed substantially at right angles thereto and adjustable along the same, said standard having a plurality of notches therein, a draft link pivotally connected to said frame and movable into engagement with said notches, and means for locking said standard in any one of a plurality of positions upon said frame.

7. In a draft connection, a frame, a standard disposed substantially at right angles thereto and adjustable along the same, said standard having a plurality of notches therein, a draft link pivotally connected to said frame and movable into engagement with said notches, and means locking both said standard and link in any of their positions of adjustment upon said frame and standard respectively.

8. In a draft connection, a frame, a notched standard protruding substantially at right angles thereto and adjustable along the same, a draft link pivoted to said frame and receivable in the notches in said standard, said link having a series of openings therein, a locking plate through one end of which the end of said standard extends, and a draft hook extending through the opposite end of said locking plate and one of the openings in said draft link.

9. In a draft connection, a frame, a standard carried thereon, a swinging draft link pivoted on said frame on opposite sides of said standard having a transversely disposed series of openings therein, means rigidly positioning said link against longitudinal movement with respect to said standard, a draft member adjustably mounted in one of the openings in said link, and a locking plate movable longitudinally of said standard having an opening therein through which said draft member extends when in position in one of the openings in said draft link.

10. A draft connection for harrows having, in combination, a harrow frame including a transverse member at the front end thereof, a draft member arranged substantially parallel with said transverse frame member, having the opposite ends thereof turned rearwardly and pivotally connected with the harrow frame in a manner permitting said draft member to be adjusted to a higher or lower plane, said draft member being provided with a series of openings spaced apart in a lateral direction, a standard having the lower end thereof provided with a loop portion that slidably receives said transverse frame member and the upper end thereof provided with notches spaced apart in a vertical direction and adapted to selectively engage with the rear side of said draft member, and means for locking said standard and draft member in adjusted relation.

11. A draft connection for harrows having, in combination, a harrow frame including a transverse member at the front end thereof, a draft member arranged substantially parallel with said transverse frame member, having the opposite ends thereof turned rearwardly and pivotally connected with the harrow frame in a manner permitting said draft member to be adjusted to a higher or lower plane, said draft member being provided with a series of openings spaced apart in a lateral direction, a standard having the lower end thereof provided with a loop portion that slidably receives said transverse frame member and the upper end thereof provided with notches spaced apart in a vertical direction and adapted to selectively engage with the rear side of said draft member, and means for locking said standard and draft member in adjusted relation, said means including a locking plate having an opening at one end adapted to slidably receive said standard, an an opening at the opposite end thereof adapted to selectively register with the openings in said draft member, and a detachable draft hook received by the openings in said plate and draft member.

CHARLES S. SHARP.

Witnesses:
E. W. CRANDALL,
MYRON H. ALGER.